United States Patent [19]

Funk

[11] 3,980,232

[45] Sept. 14, 1976

[54] AIR BLAST SPRAYING APPARATUS

[76] Inventor: Welker W. Funk, 1507 Phyllis Court, Irving, Tex. 75060

[22] Filed: Oct. 17, 1974

[21] Appl. No.: 515,691

[52] U.S. Cl. ............................... 239/77; 239/561; 239/DIG. 21
[51] Int. Cl.² ......................................... B05B 9/04
[58] Field of Search ............ 239/77, 78, 590.5, 561, 239/172, 550, DIG. 21

[56] References Cited
UNITED STATES PATENTS

| | | | |
|---|---|---|---|
| 2,587,965 | 3/1952 | Campbell | 239/77 X |
| 2,677,576 | 5/1954 | Brann, Jr. | 239/77 |
| 2,685,476 | 8/1954 | Spreng | 239/78 |
| 2,780,490 | 2/1957 | Sigvardt | 239/561 |
| 2,975,543 | 3/1961 | Funk | 239/77 X |
| 3,423,029 | 1/1969 | Demaison | 239/590.5 X |
| 3,625,426 | 12/1971 | Swanson | 239/77 |

Primary Examiner—Evon C. Blunk
Assistant Examiner—Michael Mar
Attorney, Agent, or Firm—Peter J. Murphy

[57] ABSTRACT

For spraying orchards or other agricultural products, apparatus is made up of modular components including a discharge head unit, a tank unit and a draw bar unit. In one mode of use, the discharge head unit is supported by the three-point-hitch of a tractor, and the draw bar unit is mounted on the tank unit for coupling the tank unit to a hitch mounted on the head unit. In another mode, the tank unit, discharge head unit and draw bar unit are assembled in a unitary trailer assembly to be towed by a towing tractor. In each case power is supplied by the tractor power take-off. The discharge head unit includes a centrifugal blower including a generally cylindrical housing and a generally concentric blower rotor, with high velocity discharge nozzles projecting generally radially from a generally cylindrical housing wall portion. The housing is constructed so that the nozzle wall portion is readily removable and replaced with a substitute nozzle wall portion containing a different nozzle arrangement.

11 Claims, 13 Drawing Figures

AIR BLAST SPRAYING APPARATUS

BACKGROUND AND SUMMARY OF THE INVENTION

This invention relates to an air blast sprayer for use to disseminate liquid insecticide, fungicide and herbicides into trees and field crops; and more particularly to such a sprayer having discharge nozzles for directing a high velocity blasts of air and entrained liquid into the foliage of trees, shrubs etc.

One difficulty encountered with the spraying of trees having heavy foliage, is that the foliage tends to form a protective outer sheath which acts, when a spray is directed toward it to prevent penetration of the spray into the interior of the tree. For this reason it is desirable to provide a spraying apparatus which can discharge high velocity jets of air entrained liquid, having the ability to penetrate this protective sheath and to distribute the entrained liquid within the tree as well as on the exterior foliage. One principal object of this invention therefore is to provide an efficient air blast spraying apparatus having the capability to discharge high velocity air jets with entrained liquid into the interior of trees having heavy foliage.

Another object of this invention is to provide air blast spraying apparatus having the ability to discharge high velocity spray jets, and which is adapted to be driven by the power-take-off of a towing tractor vehicle.

A further object of this invention is to provide spraying apparatus of modular construction, wherein a tank unit and a discharge head unit may be assembled as a unitary trailer towed by a tractor; or, alternatively, wherein the discharge head unit is carried by the tractor on a three-point-hitch with the tank unit being towed as a trailer; and wherein the apparatus may be quickly converted from one mode of use to another.

A further object of this invention is to provide spraying apparatus having a discharge head unit which is readily convertible from one form of nozzle arrangement to another, through the use of interchangeable nozzle assemblies.

Still another object of this invention is to provide a spraying apparatus for producing, efficiently, jets of liquid entrained air having maximum velocity.

These objects are accomplished in apparatus including a discharge head unit comprising a generally horizontal base frame and laterally spaced supports on the frame including means defining a horizontal rotation axis. A discharge head comprises a generally flat and cylindrical blower housing and enclosed rotor both rotatably mounted about the frame rotation axis, with the blower housing having generally parallel side walls and a generally cylindrical peripheral wall, at least one side wall having a central inlet opening. A plurality of elongated discharge nozzles are rigidly mounted on the peripheral wall, projecting generally radially outward therefrom. The blower rotor has generally radial vanes, with the radially outer edges thereof spaced substantially from the housing peripheral wall. Bearing means are associated with each of the housing side walls for rotatably supporting the side walls relative to the rotation axis; and spacer means are provided at spaced peripheral points of the side walls for supporting them in spaced relation to each other. The housing peripheral wall is fabricated from at least one generally cylindrically formed section; and coacting clamping means are mounted on the respective joining ends of that peripheral section for clamping that section of the side walls.

These objects are further accomplished in air blast spraying apparatus comprising, in combination, a tank unit, a discharge head unit and a draw bar unit as modular components. The tank unit comprises a base frame including parallel side members, support wheel means mounted on the base frame, and a vessel for containing liquids mounted on said base frame. The discharge unit comprises a base frame including parallel side members, spaced shaft support member mounted on the base frame for rotatably supporting a horizontal shaft, and a discharge head rotatably supported on the shaft. The tank unit, discharge unit and draw bar unit have complementary means for selectively coupling same in a unitary trailer assembly; and the tank unit, discharge head unit and draw bar unit have complementary means for alternatively coupling said tank unit and draw bar unit in a trailer assembly to be pivotally coupled to said discharge head unit.

The novel features and the advantages of the invention, as well as additional objects thereof, will be understood more fully from the following description when read in connection with the accompanying drawings.

DESCRIPTION OF THE PREFERRED EMBODIMENTS

Apparatus according to this invention has been designed for use in two modes; and for that purpose the apparatus is designed in the form of modules which may be assembled in different ways according to the desired use mode. The base modules are a discharge head unit 10, a tank unit 11 and a draw bar unit 12. Accessory modules are the three-point-hitch frame 13, trailer hitch 14 and coupling channels 15.

Figures 10, 13:
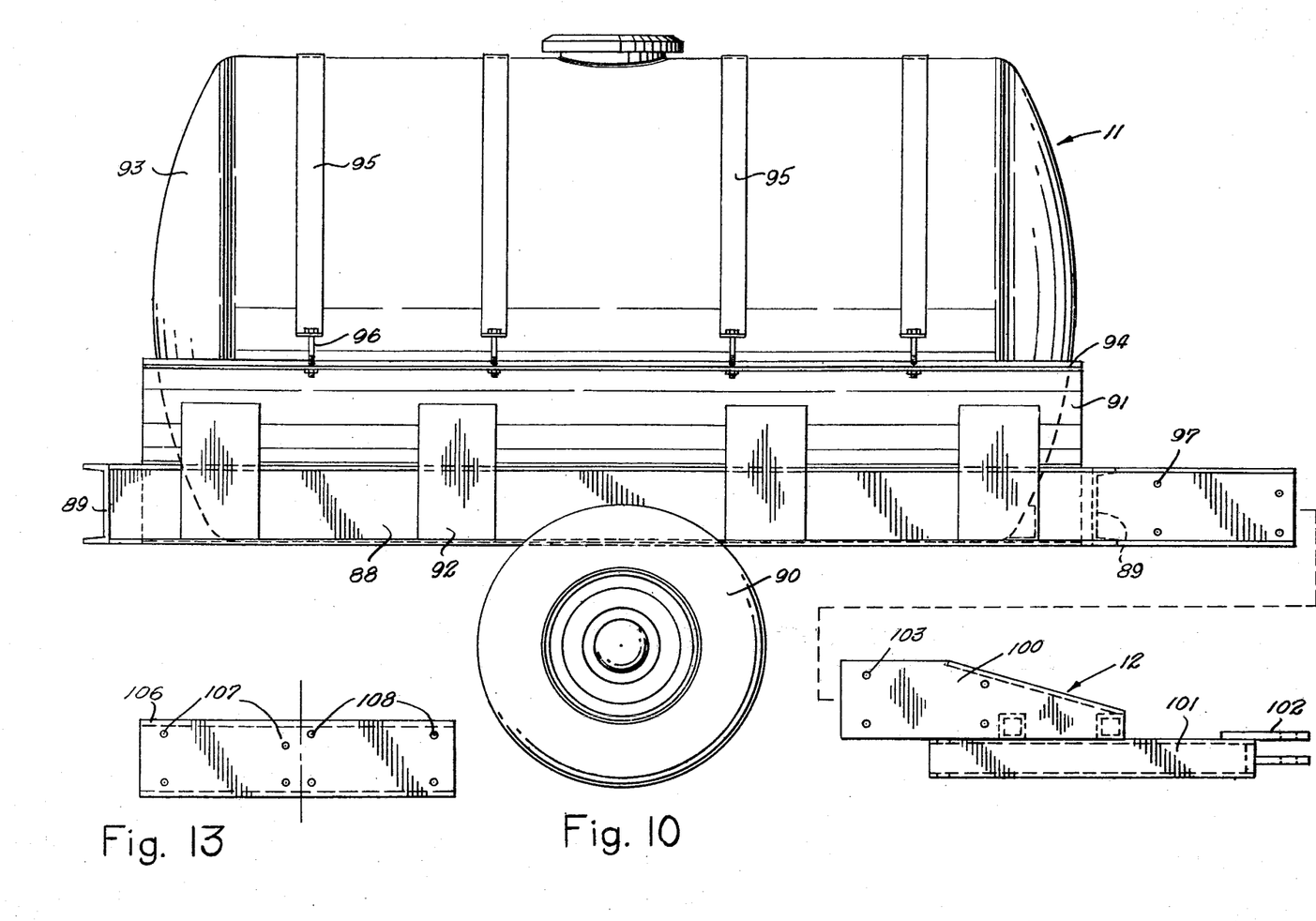
FIG. 10 is an exploded side elevation view of the tank unit and detachable draw unit.
FIG. 13 is a side elevation view of a coupling channel for the trailer assembly of FIGS. 11 and 12.

In one mode of use, the discharge head unit 10 is mounted on a tractor unit (not shown) having a three-point-hitch (TPH), a power take off (PTO), and a hydraulic system for operating hydraulically powered accessories. In this mode, the tank unit 11 is drawn behind the discharge head unit by means of a suitable trailer hitch. FIGS. 1 through 5 of the drawings illustrate the discharge head unit for this mode of operation; and FIG. 10 illustrates the tank unit for this mode of operation. This mode of operation is referred to as the "TPH mode".

In the alternative use mode, referred to as the "trailer mode", the tank unit, discharge head unit, and draw bar unit 12 are coupled together as a unitary trailer assembly to be towed by a tractor unit. This mode is particularly illustrated in FIGS. 11 and 12.

THREE-POINT-HITCH MODE

Figure 1:
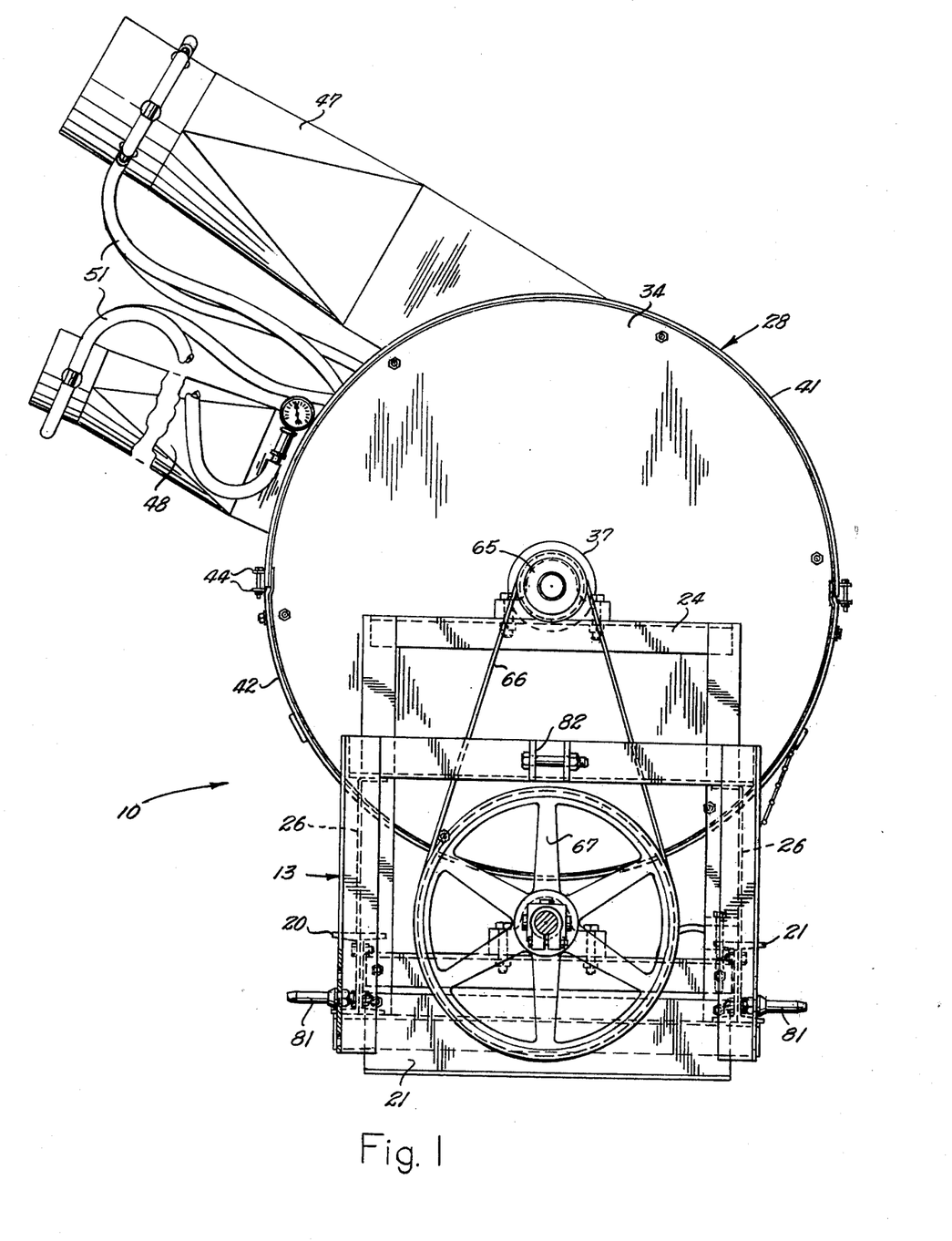
FIG. 1 is a front elevation view of a discharge head unit of the apparatus, for attachment to the three-point-hitch of a tractor.
Figure 2:
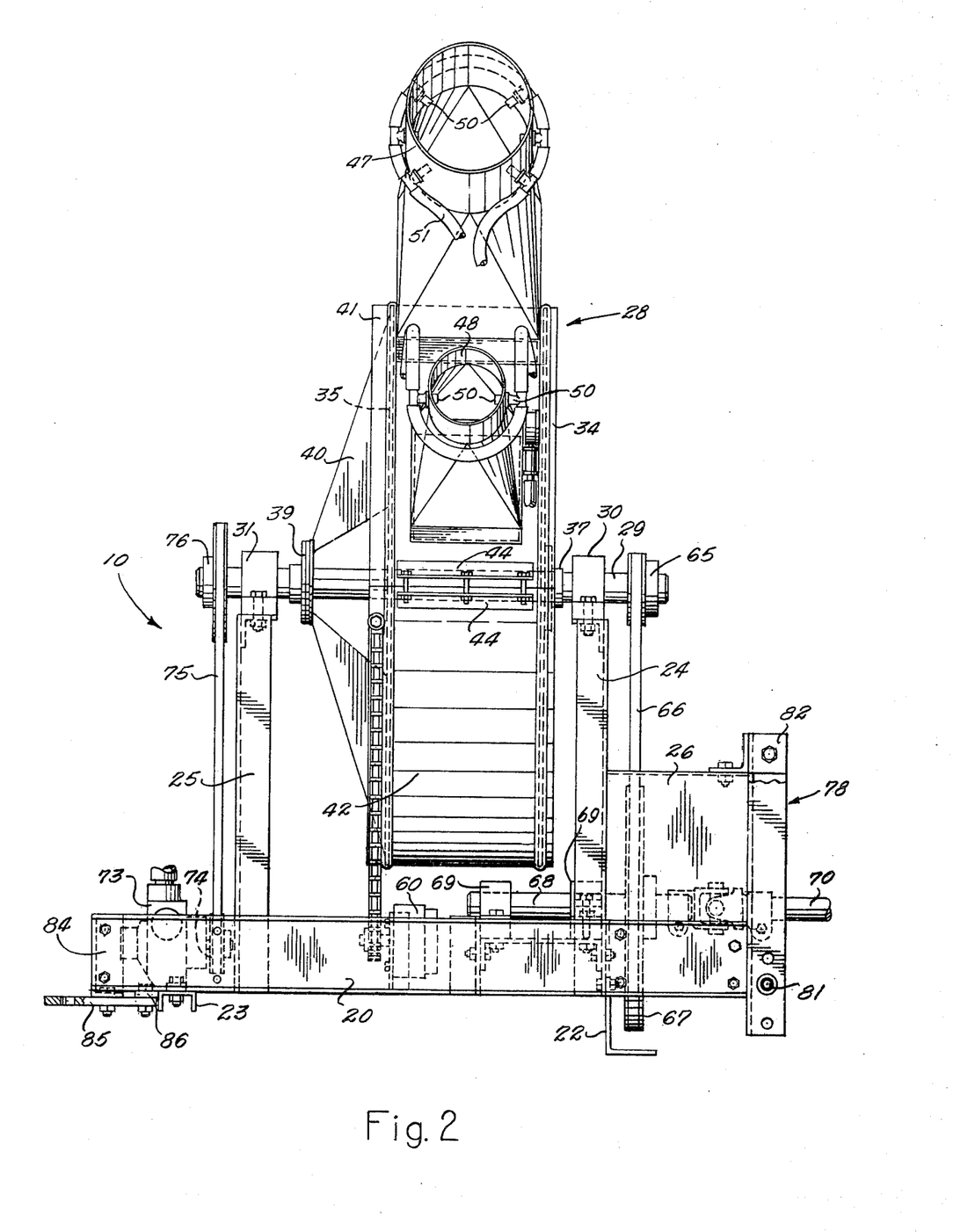
FIG. 2 is a side elevation view of the discharge head unit of FIG. 1, as viewed from the right side thereof.
Figure 3:
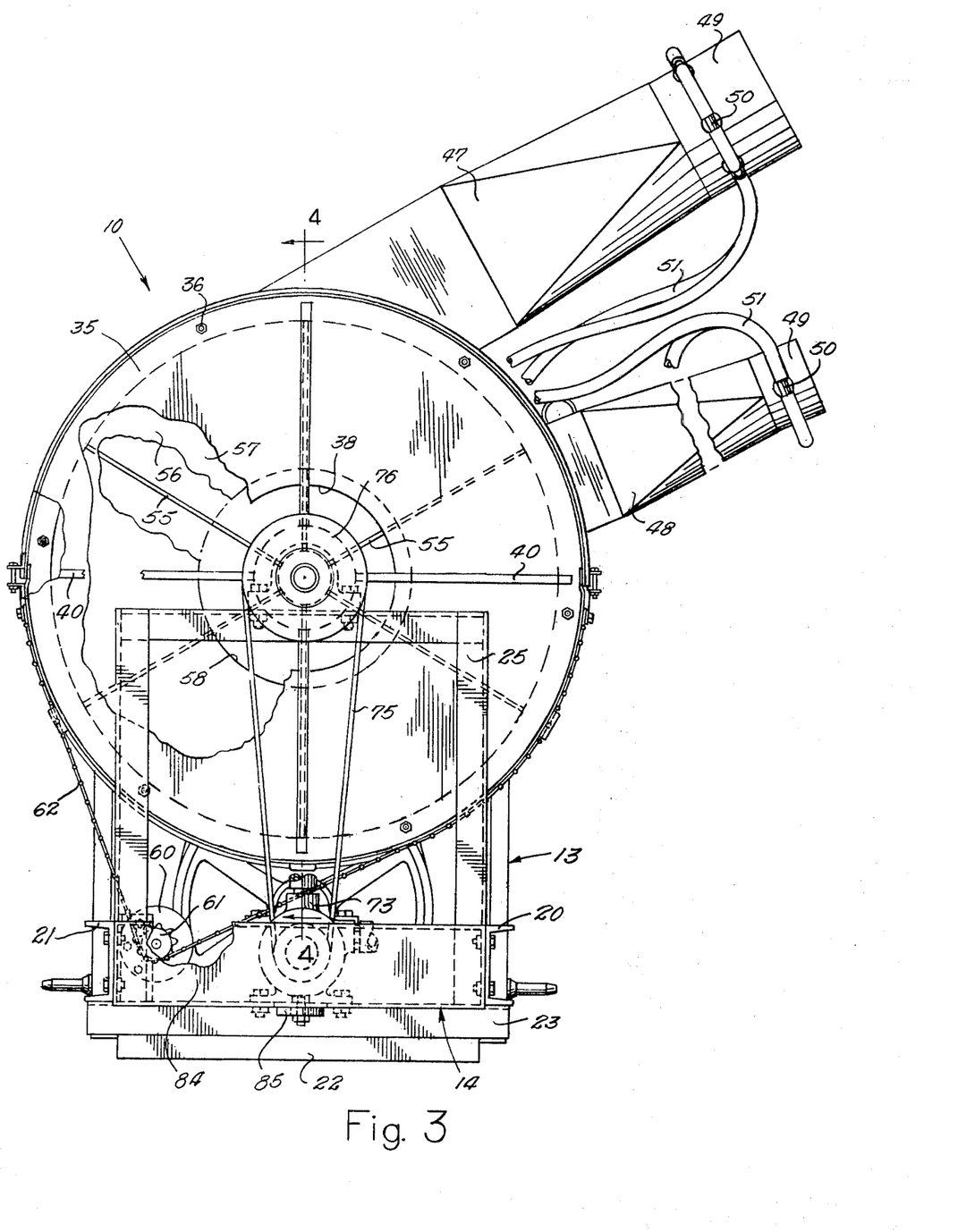
FIG. 3 is a rear elevation view of the discharge head unit of FIG. 1.

The general construction of the discharge head unit 10 is particularly illustrated in FIGS. 1, 2 and 3. This unit includes a main frame consisting of side frame members 20 and 21, front member 22 and rear member 23 preferably in the form of steel channels. Front and rear bearing frames 24 and 25 are inverted U-shaped frames secured to the side frame members; and the front bearing frame 24 is stabilized by side plates 26 secured to the main frame and the bearing frame.

A discharge head 28 includes a drive shaft 29 rotatably supported in front and rear bearings 30 and 31 respectively, a blower housing rotatably supported on the drive shaft 29, and a blower rotor 32 nonrotatably fixed on the drive shaft 29 within the housing and concentric therewith. The bearings 30 and 31 are of a type to axially confine the shaft relative to the bearings and respective bearing frames.

Figure 4:
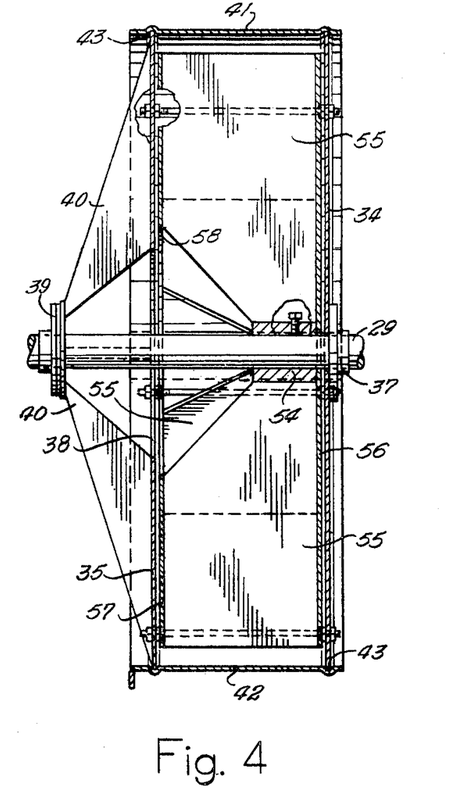
FIG. 4 is a sectional view taken in the vertical plane 4—4 of FIG. 3 illustrating details of the discharge head housing and the blower rotor.

The blower housing includes a front wall plate 34 and a rear wall 35, both preferably fabricated of relatively heavy gauge steel, maintained in desired spaced relation by spacer bolts 36 best seen in FIG. 4. The front plate is rotatably supported on the drive shaft by means of a bearing 37. The rear plate includes a relatively large inlet opening 38, and is supported on the shaft by means of a bearing 39 carried by support brackets 40. The bearings 37 and 39 axially confine the respective plates on the shaft 29. The peripheral housing wall is formed by mating semi-cylindrical portions consisting of a nozzle wall 41 and a closing wall 42. These walls are provided with internal annular grooves 43 for receiving respective peripheral edges of the front and rear walls; and the walls are further provided with transverse clamping flanges 44 adjacent to the joining edges wherein the nozzle wall and closing wall are secured together, by means of suitable bolts, in overlapping relation and in rigid assembled relation with the front and rear walls.

The nozzle wall 41 has fixed thereto a pair of elongated discharge nozzles 47 and 38, which extend generally radially relative to the discharge head housing forming an acute angle with each other. As viewed in FIGS. 1 and 3 the upper nozzle 47 is somewhat larger, and has more of a tangential relation with the housing than does the smaller nozzle 48 which is generally coextensive with the larger nozzle. As particularly illustrated, these nozzles are close to parallel; and this discharge head is particularly designed for spraying relatively tall trees when foliage penetration at a considerable distance is required. The nozzle tips 49 are cylindrical, this being the preferred shape for maximum velocity and penetration of the nozzle jet; however, these nozzle tips could have a square or other cross-section if desired. Each of the nozzle tips includes a plurality of internal spray nozzles 50 for connection by suitable hoses 51 to the liquid pump to be described.

Figure 6:
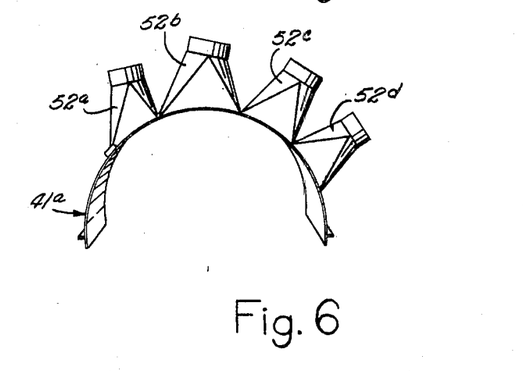
FIG. 6 is a perspective view of an alternative nozzle wall for the discharge head housing, providing four discharge nozzles in lieu of the two nozzles illustrated in FIG. 1.

With the above described housing design, the nozzle wall 41 and associated nozzles is readily removed and and replaced with a substitute nozzle wall; such as nozzle wall 41a illustrated in FIG. 6. The nozzle wall 41a would be provided with the same spaced annular grooves for receiving the front and rear walls; and this nozzle wall is provided with four discharge nozzles 52a through 52d which project generally radially from the wall, forming acute angles with each other. This nozzle wall 41a is particularly designed for spraying shorter trees to provide top to bottom coverage and penetration of such trees.

The blower rotor 32, as best seen in FIGS. 3 and 4, includes a hub 54 for nonrotatably securing the rotor to the drive shaft 29, six radial vanes 55, a closing front plate 56, and an annular rear plate 57 defining a central inlet opening 58 concentric with the housing inlet opening 38. A substantial annular clearance space is provided between the housing periphery and rotor periphery; and this may be as little as one inch in relation to a housing radius of 44 inches for example; or may be substantially larger up to ⅓ the extent of the housing radius for example.

The discharge head 28 is rotatable to position the nozzles 47 and 48 at the desired angles of elevation and this is preferably done remotely from the towing tractor unit. For this purpose the head unit is provided with a rotary hydraulic motor 60 suitably mounted on the unit frame and carrying a drive sprocket 61. The drive sprocket drives a length of link chain 62 having its opposite ends secured to the housing by suitable bolts approximately 180° apart. Accordingly the head may be rotated something less than 180° by the hydraulic motor. The chain could be of greater length for rotating the head through a much larger angle if desired. The hydraulic motor 60 preferably would be connected by suitable hoses to a hydraulic system of the towing tractor.

For driving the drive shaft 29, a pulley 65 is nonrotatably fixed to the forward end of the shaft and is coupled by means of a belt 66 to a larger driving pulley 67 nonrotatably mounted on a shaft 68. The shaft 68 is rotatably mounted in axially spaced bearings 69 which are carried on brackets adjustably mounted on the unit frame for the purpose of adjusting the tension of the drive belt 66. The pulleys 65 and 67 may be multiple groove pulleys coupled by a plurality of drive belts 66. A PTO extension shaft 69 is connected to the shaft 68, for coupling to the PTO drive of the towing tractor. With a pulley ratio of 4 to 1 for example the blower rpm will be 4 times that of the PTO.

A centrifugal fluid pump 73 is mounted on the rear frame member 23, the shaft of which carries a driven pulley 74, driven by a suitable belt 75 from a driving pulley 76 nonrotatably mounted on the blower drive shaft 29. This pump is connected to the supply tank to be described through suitable supply hoses; and the hoses 51 are connected to the pump outlet for supplying liquid to the nozzles 50. The pump is preferably provided with a bypass circuit; and the hoses 51 are preferably of a length to extend to the towing tractor and include shutoff valve, for controlling liquid flow to the nozzles.

Figure 7:
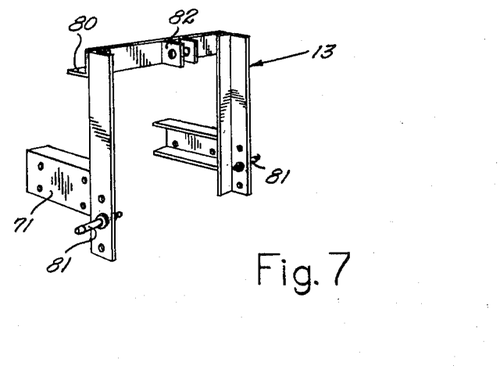
FIGS. 7 and 8 are perspective views of removable hitch components for the discharge head unit.

For coupling the discharge head unit to a tractor TPH, the TPH frame 13, particularly illustrated in FIG. 7, is attached to the head unit frame. This TPH frame is an inverted U-shaped assembly including side brackets 79 and a top bracket 80, and also including oppositely projecting side pins 81 and a top clevis 82 for coupling to the tractor TPH. As best seen in FIG. 2 the TPH frame is secured to the head unit frame, with the side brackets 79 being bolted to the head frame side brackets 20 and 21 and with the top bracket 80 being bolted to the side plates 26. The TPH frame, then, is attached to the head unit frame for the TPH mode; and is readily detachable for the trailer mode as will be described.

Figure 5:
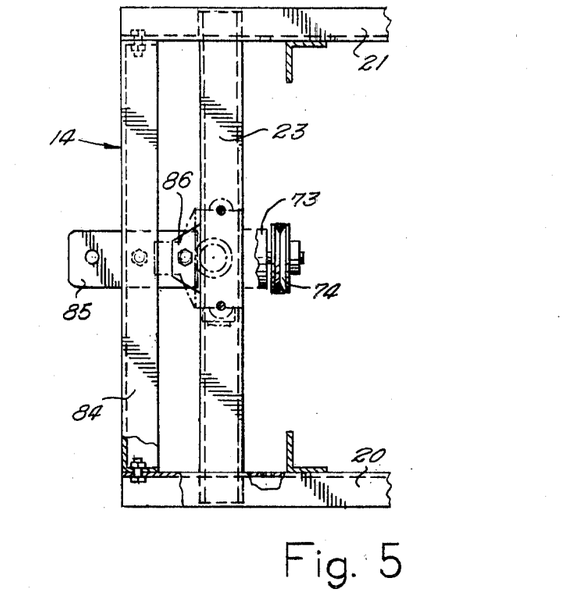
FIG. 5 is a fragmentary plan view of the discharge head unit frame and removable trailer hitch.
Figure 8:
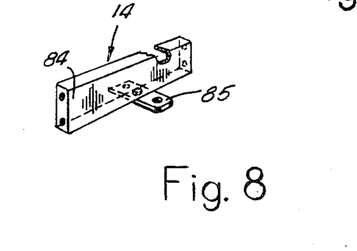

The trailer hitch attachment 14 is also temporarily secured to the discharge head unit for the TPH mode; and this attachment consists of a transverse frame member 84 having secured thereto a hitch plate 85 as seen in FIG. 8. In assembled relation, as best seen in FIGS. 2 and 5, the frame member 84 is bolted between the head frame members 20 and 21; and hitch plate 85 is bolted additionally to a boss 86 secured to the transverse frame member 23.

FIG. 10 illustrates the tank unit 11 and the assembled relation of the draw bar unit 12 for the TPH mode. The tank unit includes a rectangular frame consisting of parallel side channels 88 and transverse member 89; and support wheels 90 are secured to this frame preferably in a manner to be adjustable forwardly and rearwardly. The frame also includes a sheet metal saddle 91 which is nested between the side channels and is additionally supported by brackets 92. This assembly of frame, saddle and brackets is preferably a welded assembly. The saddle 91 has a cylindrical contour on a radius conforming to the radius of a cylindrical tank 93 to be supported; and this tank may be a one piece cast from polyethylene for example. The saddle is provided with out-turned flanges 94 at its side edges; and the tank is secured within the saddle by means of straps 95 passing over the tank and secured to the flanges by means of adjustable tension bolts 96.

Figure 9:
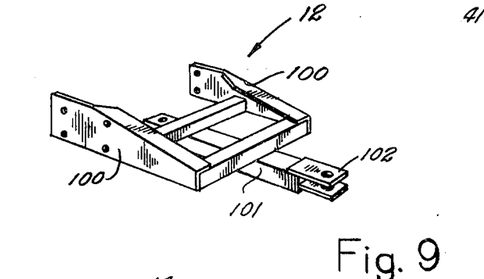
FIG. 9 is a perspective view of a draw bar unit.

The draw bar unit 12, illustrated in FIG. 9, includes parallel side members 100 interconnected by parallel transverse members supporting a tongue 101 with an associated clevis 102 at its forward end. The draw bar side members 100 are spaced apart to be received within the side frame members 88 of a tank unit, and the draw bar unit is detachably secured to the tank unit by means of bolts secured in the mating holes 103 and 97 of the respective side frame members.

In assembled operative relation, the clevis of the assembled tank and draw bar unit 11, 12 is secured to the hitch plate 85 of the discharge head unit 10; and hoses (not shown) are connected between the tank 93 and the inlet of the pump 73.

TRAILER MODE

Figures 11, 12:
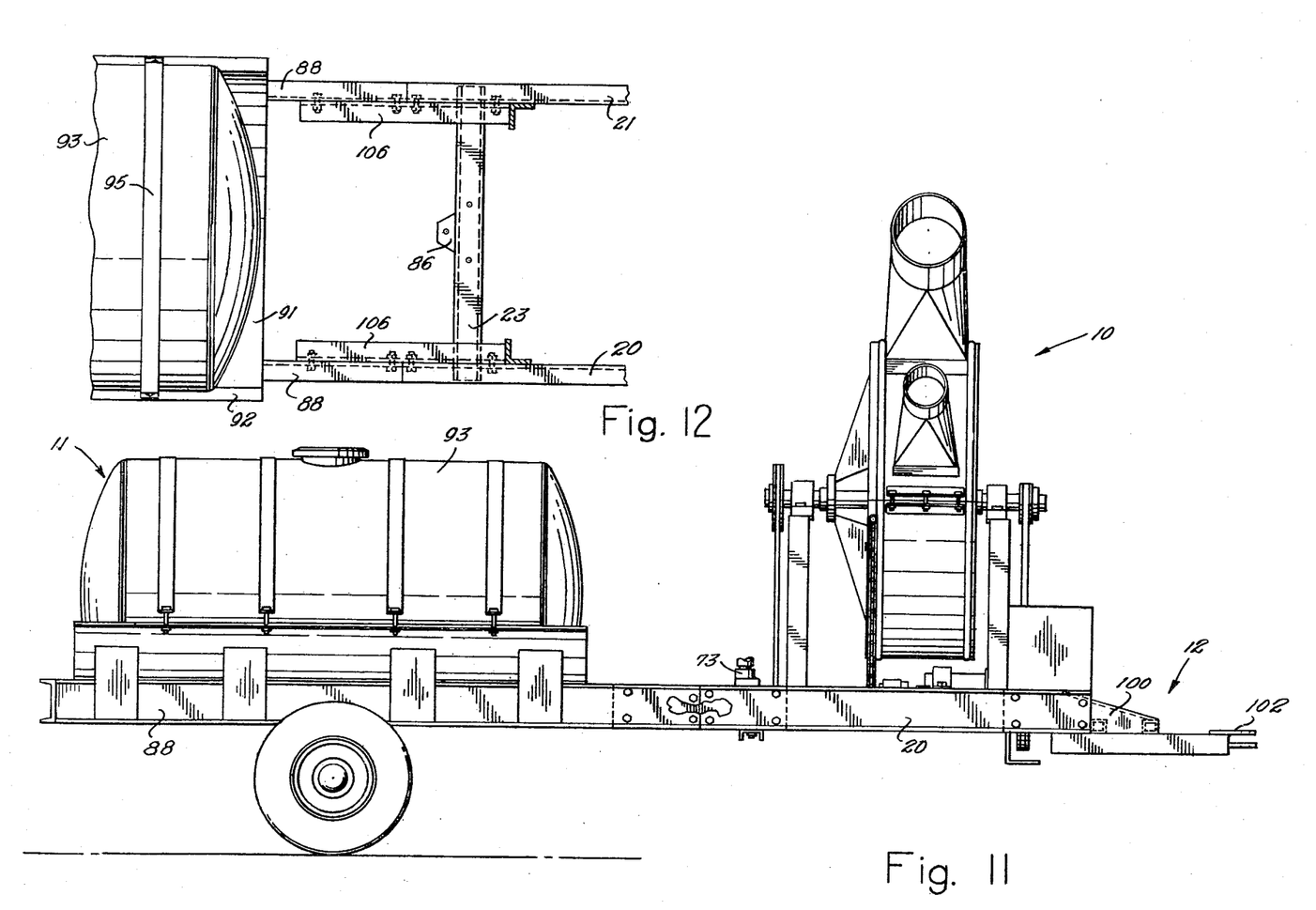
FIG. 11 is a side elevation of a trailer assembly including the trailer unit, discharge head unit and draw bar unit.
FIG. 12 is a fragmentary plan view of portions of the assembly of FIG. 11.

For use in the trailer mode, the tank unit 11, the discharge head unit 10 and the draw bar unit 12 are assembled into a common trailer unit to be coupled to a towing tractor for example; and this mode is illustrated in FIGS. 11, 12 and 13. For this mode, the TPH frame 13 and the trailer hitch attachment 14 are removed from the discahrge head unit and are not used. The draw bar unit 12 is secured to the front end of the discharge head unit frame, and for this purpose the draw bar unit side members 100 are received within the frame members 20 and 21 and secured by means of suitable bolts. The head unit frame and the tank unit frame are coupled together by means of coupling channels 106 having sets of holes 107 and 108. As best seen in FIG. 12, these channels are secured to the tank unit frame by suitable bolts mating the coupling channel holes 107 with the tank frame holes 97; and the head unit is then coupled by means of bolts mating the coupling channels holes 108 with mating holes in the frame members 20 and 21.

For use in this mode, the trailer assembly is again preferably towed by a tractor having a PTO for driving the discharge head with the trailer unit clevis 102 coupled to a suitable tractor hitch plate. Again the tractor should preferably be equipped with a hydraulic system for operating the head rotation hydraulic motor 60.

With the exception of the tank 93, the described apparatus is principally fabricated from structural and sheet steel.

OPERATION

The operation of the apparatus, in either of the above described modes, is readily controlled by a single operator who will also be the operator of the towing tractor. He controls the drive for the blower and liquid of pump through the tractor power takeoff. He selects the desired elevation of the discharge head nozzles through the tractor hydraulic system operating the hydraulic motor 60. He controls the supply of liquid to the spray nozzles 50 through valves in the nozzle supply lines 51 which are supported in operative position on the towing tractor. Accordingly the tractor operator has complete control of the entire spraying operation.

What has been described is an improved air blast spraying apparatus having a number of novel features.

One feature of the apparatus is the descirbed power rotation means wherein the discharge head may be rotated through any desired angle which may well exceed 180° so that the head may be rotated from a position where the nozzles are below horizontal on one side of the unit, to a position where they are below horizontal on the other side. It will be appreciated that while one discharge head is disclosed and described, the discharge head unit could be provided with two similar discharge heads axially spaced from each other and each being independently rotatable and controlled to spray simultaneously to either side of the discharge head unit.

An important feature of the discharge head is that the blower rotor is generally concentric with the nozzle wall of the blower housing, with inner ends of the discharge nozzles being generally equi-distant from the blower rotor to receive the discharge air with minimum loss of velocity energy.

A related feature is the ready demounting and remounting of interchangeable nozzle walls, to select several alternative nozzle arrangements for particular spraying applications of the apparatus.

Another important feature of the apparatus is the modular construction wherein the apparatus is adaptable to different spraying applications.

While preferred embodiments of the invention have been illustrated and described, it will be understood by those skiled in the art that changes and modifications may be restored to without departing from the spirit and scope of the invention.

What is claimed is:

1. In air blast spraying apparatus, a discharge head unit comprising a generally horizontal base frame; laterally spaced supports mounted on said frame including means defining a horizontal rotation axis;

a discharge head comprising a blower housing and enclosed blower rotor, both rotatably mounted about said frame rotation axis; said blower housing having generally parallel side walls and a generally cylindrical peripheral wall, at least one side wall having a central inlet opening, a plurality of elongated discharge nozzles rigidly mounted on said peripheral wall, projecting generally radially outward therefrom in circumferentially spaced relation;

said blower rotor having generally radial vanes, with the radially outer edges thereof spaced from the housing peripheral wall to define a substantial clearance space between said rotor vanes and the inlet ends of said nozzles;

bearing means associated with each of said housing side walls for rotatably supporting said side walls relative to said horizontal rotation axis; spacer means provided at spaced peripheral points of said side walls, for supporting said side walls in spaced relation to each other;

said housing peripheral wall being fabricated from at least one generally cylindrically formed section; and coacting clamping means mounted on the respective joining ends of said peripheral wall section for clamping said section to said side walls.

2. Apparatus as set forth in claim 1
said peripheral wall section having axially spaced internal grooves for receiving the peripheral edges of said side walls.

3. Apparatus as set forth in claim 1
said horizontal rotation axis comprising a shaft rotatably supported in said frame spaced supports; said blower rotor being non-rotatably mounted on said shaft;
and said side wall bearing means rotatably supporting said side walls on said shaft.

4. Apparatus as set forth in claim 1
said housing peripheral wall being fabricated from two generally semi-cylindrical sections; and said discharge nozzles being rigidly mounted on at least one of said peripheral wall sections.

5. Apparatus as set forth in claim 4
said discharge nozzles being mounted on only one of said peripheral wall sections.

6. Air blast spraying apparatus comprising in combination a tank unit, a discharge head unit, and a draw bar unit;

said tank unit comprising a base frame including parallel side frame members, support wheel means adjustably mounted on said base frame, and a vessel for containing liquids mounted on said base frame;

said discharge head unit comprising a base frame including parallel side frame members, spaced shaft support members mounted on said base frame for rotatably supporting a shaft in parallel relation to said side frame members; and a discharge head rotatably supported on said shaft;

means for selectively coupling said tank unit, said discharge head unit and said draw bar unit in a unitary trailer assembly to be pivotally coupled to a tractor; and means for selectively coupling said tank unit and said draw bar unit in a trailer assembly to be pivotally coupled to said discharge head unit.

7. Apparatus as set forth in claim 6
a three-point-hitch frame for selective attachment to said discharge head unit, whereby said discharge head unit is suported from a tractor three-point-hitch.

8. Apparatus as set forth in claim 6
said draw bar unit having mounting means complementary to both said tank unit and said discharge head unit whereby said draw bar unit is attachable alternatively to said tank unit and said discharge head unit.

9. Apparatus as set forth in claim 6
a three-point-hitch frame and said draw bar unit each having mounting means complementary to mounting means at the forward end of said discharge head unit, for alternative attachment to said discharge head unit.

10. Apparatus as set forth in claim 6
a trailer hitch attachment selectively mountable at the rearward end of said discharge head unit, defining a pivot coupling for said tank unit draw bar unit trailer assembly.

11. Apparatus as set forth in claim 6
coupling channels for coupling said head unit frame to said tank unit frame;
said tank unit frame having coupling means complementary to both said coupling channels and to said draw bar unit.

* * * * *